US011711490B2

(12) United States Patent
Musser, Jr.

(10) Patent No.: US 11,711,490 B2
(45) Date of Patent: *Jul. 25, 2023

(54) VIDEO FRAME PULLDOWN BASED ON FRAME ANALYSIS

(71) Applicant: Home Box Office, Inc., New York, NY (US)

(72) Inventor: Elmer G. Musser, Jr., Northport, NY (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,559

(22) Filed: Mar. 4, 2022

(65) Prior Publication Data

US 2022/0191426 A1 Jun. 16, 2022

Related U.S. Application Data

(63) Continuation of application No. 16/843,418, filed on Apr. 8, 2020, now Pat. No. 11,303,847.

(60) Provisional application No. 62/875,250, filed on Jul. 17, 2019.

(51) Int. Cl.
*H04N 7/01* (2006.01)
*H04N 19/587* (2014.01)

(52) U.S. Cl.
CPC .......... *H04N 7/0115* (2013.01); *H04N 7/013* (2013.01); *H04N 7/014* (2013.01); *H04N 7/0135* (2013.01); *H04N 7/0137* (2013.01); *H04N 7/0147* (2013.01); *H04N 19/587* (2014.11)

(58) Field of Classification Search
None
See application file for complete search history.

(56) References Cited

U.S. PATENT DOCUMENTS

| | | | |
|---|---|---|---|
| 4,240,101 | A | 12/1980 | Michael et al. |
| 6,658,056 | B1 | 12/2003 | Duruoz et al. |
| 7,589,790 | B2 | 9/2009 | Wyman |
| 8,660,175 | B2 | 2/2014 | Dane et al. |

(Continued)

FOREIGN PATENT DOCUMENTS

CN 105828106 A 8/2016

OTHER PUBLICATIONS

Non Final office action received for U.S. Appl. No. 16/843,418 dated Dec. 30, 2020, 24 pages.

(Continued)

*Primary Examiner* — David N Werner
(74) *Attorney, Agent, or Firm* — Amin, Turocy & Watson, LLP

(57) ABSTRACT

The described technology is directed towards generating a new video image sequence (e.g., for playback at 30 frames per second) based on an existing video image sequence (e.g., originated for playback at 24 frames per second). The technology is based on processing frames, e.g., adjacent pairs of frames in a four-frame sequence, to obtain candidate frames for selecting a similar candidate frame to insert into the original sequence to create the new sequence (e.g., a five-frame sequence). Aspects include selecting a repeated frame to insert or creating a new frame from existing frames to insert, to generate the new sequence based on a difference/scoring comparison.

20 Claims, 14 Drawing Sheets

(56) References Cited

U.S. PATENT DOCUMENTS

| | | |
|---|---|---|
| 9,918,041 B1 | 3/2018 | Zhang et al. |
| 11,303,847 B2* | 4/2022 | Musser, Jr. .......... H04N 19/587 |
| 2004/0257434 A1 | 12/2004 | Davis et al. |
| 2005/0036064 A1 | 2/2005 | Lee |
| 2005/0195325 A1 | 9/2005 | Tanaka |
| 2005/0220189 A1 | 10/2005 | Brooks et al. |
| 2009/0115845 A1 | 5/2009 | Walls et al. |
| 2009/0161017 A1 | 6/2009 | Glen |
| 2009/0322940 A1 | 12/2009 | Kempf |
| 2010/0020232 A1 | 1/2010 | Mori et al. |
| 2010/0033620 A1 | 2/2010 | Hoshino et al. |
| 2010/0329359 A1 | 12/2010 | Iyer et al. |
| 2012/0162439 A1 | 6/2012 | Deng et al. |
| 2012/0307153 A1 | 12/2012 | Terai et al. |
| 2013/0069922 A1 | 3/2013 | Ueno et al. |
| 2014/0056354 A1 | 2/2014 | Chen et al. |
| 2014/0294320 A1 | 10/2014 | Kokaram et al. |
| 2014/0362289 A1 | 12/2014 | Parkhomenko et al. |
| 2015/0319406 A1 | 11/2015 | Brasnett |
| 2016/0050430 A1 | 2/2016 | Xiu et al. |
| 2016/0094803 A1 | 3/2016 | Possos et al. |
| 2016/0360199 A1 | 12/2016 | Reznik et al. |
| 2016/0360225 A1 | 12/2016 | Diggins et al. |
| 2019/0045211 A1 | 2/2019 | Pohl et al. |
| 2022/0256183 A1* | 8/2022 | Mangan ................ H04N 7/0127 |
| 2022/0279023 A1* | 9/2022 | Solari ................... H04L 9/3263 |

OTHER PUBLICATIONS

Liu et al., "Video classification for video quality prediction", 7 J. Zhejiang U. Sci. A, May 2006, pp. 919-926.

International Search Report and Written Opinion received for International Application Serial No. PCT/US2020/042382 dated Oct. 21, 2020, 18 pages.

Qu et al., "Non-Integer Times Frame Rate Up-Conversion Using Reliable Analysis of Motion Information", 2016 IEEE International Conference on Signal Processing, Communications and Computing (ICSPCC), IEEE, Aug. 5, 2016, 6 pages.

Hilman et al., "Using Motion-Compensated Frame-Rate Conversion for the Correction of 3:2 Pulldown Artifacts in Video Sequences", IEEE Transactions on Circuits and Systems for Video Technology, Institute of Electrical and Electronics Engineers, US, vol. 10, No. 6, Sep. 1, 2000, pp. 869-877.

Final office action received for U.S. Appl. No. 16/843,418 dated Jun. 24, 2021, 23 Pages.

Notice of Allowance received for U.S. Appl. No. 16/843,418 dated Dec. 20, 2021, 25 Pages.

\* cited by examiner

VIDEO FRAME PULLDOWN BASED ON FRAME ANALYSIS

CROSS-REFERENCE TO RELATED APPLICATION

This application is a continuation of and claims priority to U.S. patent application Ser. No. 16/843,418, filed on Apr. 8, 2020 and entitled "VIDEO FRAME PULLDOWN BASED ON FRAME ANALYSIS," which is a non-provisional of and claims priority to U.S. Provisional Patent Application No. 62/875,250, filed on Jul. 17, 2019 entitled "VIDEO FRAME PULLDOWN BASED ON FRAME ANALYSIS." The entireties of the aforementioned applications are hereby incorporated herein by reference.

COPYRIGHT DISCLAIMER

A portion of the disclosure of this patent document, which may include copyrighted images, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Frame pulldown (sometimes identified with two words, "pull down") refers to "stretching" a video by inserting new frames into the video, such as to convert groups of four frames of video into five frames. By way of example, consider a film recorded at 23.976 frames per second (often referred to as 24 frames per second). In the United States and other countries where television uses a 59.94 Hz vertical scanning frequency, video is broadcast at 29.97 frames per second (often referred to as 30 frames per second). For the film's motion to be accurately rendered on the video signal, a pulldown process is used to convert from the source's 24 frames per second to the needed 30 frames per second.

One way to perform pulldown is to repeat a field from every other frame, referred to as 2:3 (or 2-3) pulldown. Consider for example four frames A, B, C and D, which are divided into two fields each, providing AA, BB, CC, and DD. When creating a five frame sequence, the second and fourth frames can each have a repeated field, such that the fields are A A B B B C C D D D, which then make fields AA BB BC CD and DD. Note that by repeating fields of the first and third frames instead of the second and fourth, this can be alternatively arranged as A A A B B C C C D D, referred to as 3:2 (or 3-2) pulldown. This process repeats, whereby 24 frames per second can be displayed as 30 frames per second. Note that the actual frame rate used is 29.97 frames per second, which is a legacy carryover from television going to color and avoiding a problem with television broadcast sound subcarrier.

Video that has been converted with conventional pulldown often suffers from undesirable visible effects such as judder. At the same time, with video streaming, while it is possible to stream video at 24 frames per second and avoid pulldown, 30 frames per second provides a much better viewing experience for streams that play fast motion, such as streamed sporting events. Note that the frame rate for a linear feed needs to remain constant, and, for example, cannot be dynamically changed from 30 frames per second to 24 frames per second back to 30 frames per second.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards creating new frames and/or repeating frames to fill in the needed frames in a sequence. Note that when creating new frames to produce a sequence at 30 frames per second, challenges can arise. For example, high dynamic range images at 24 frames per second suffer from stutter as a result of the brighter images, which is a well-known issue. Adding new frames even to standard-dynamic-range video creates its own stutter issues. Further, broadcast is normally interlaced, whereby the "fingers" created by temporal differences tend to make the image jagged. In progressive rendering, the image is blended, but this also results in a double image within the image.

The technology described herein modifies the sequence. This modification is based on dealing with images in computer files. As described herein, computing resources allow making informed decisions based on analyzing the relevant images. It should be noted that the technology described herein is not limited to modifying the sequence and can be used for other purposes; for example, the technology described herein can be used to replace a missing frame in film restoration.

Figure 1:
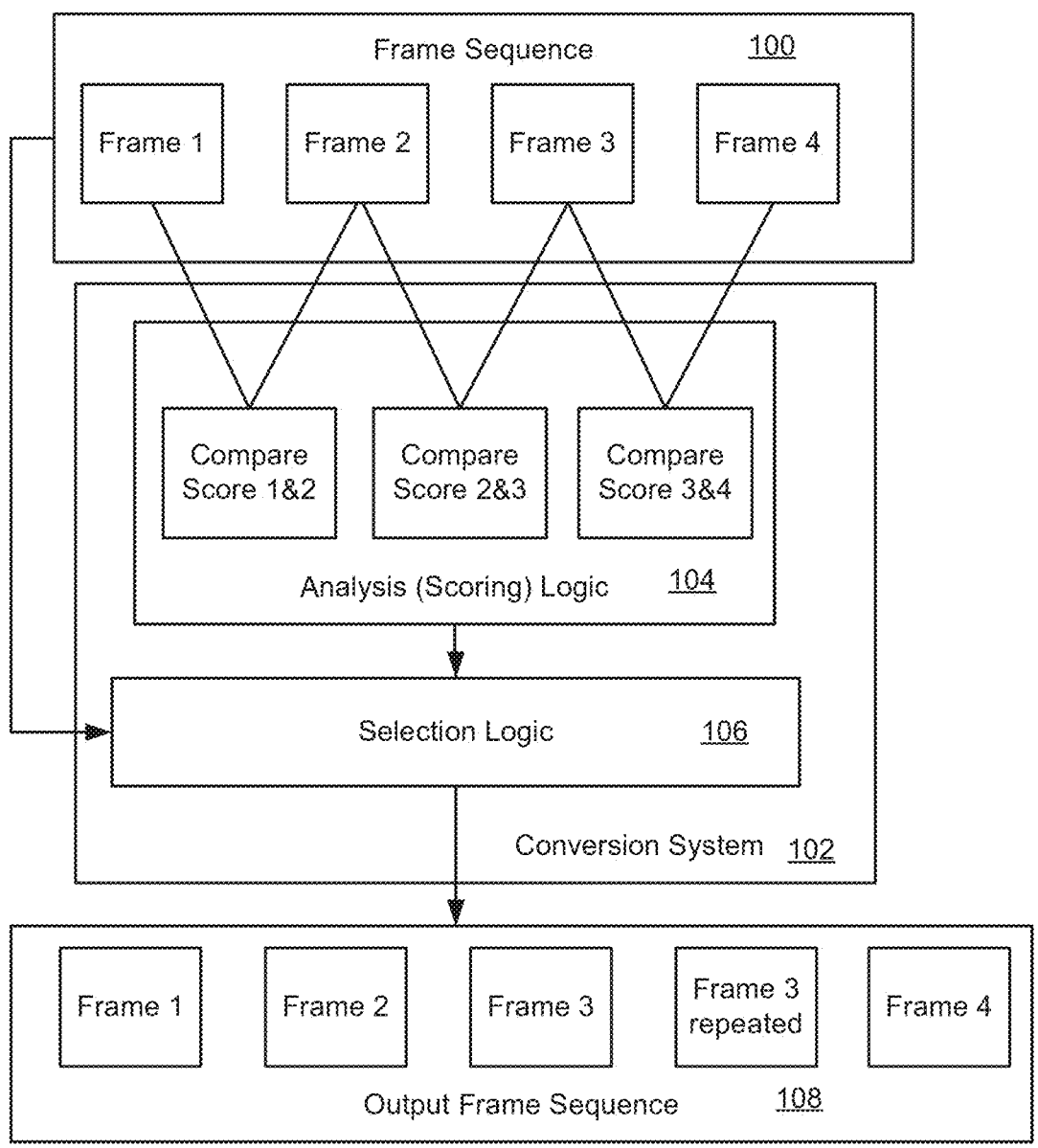
FIG. 1 is a block diagram representation of various example components and data related to analyzing frames to select a frame for video frame pulldown insertion, in accordance with various aspects and example implementations of the subject disclosure.

In general, to determine a frame to fill in, a task described herein is to determine which created frame or repeated frame results in the least amount of stutter. In one or more implementations described herein and generally represented in FIG. 1, given a frame sequence 100, a conversion system 102 comprising analysis (scoring) logic 104 analyzes frame pairs 1 and 2, 2 and 3, and 3 and 4 to obtain a score indicating which pair set has the greatest difference or the least difference. The frame pairs can be analyzed for repetition of a frame, or the frame pairs can be combined into a newly created frame, with the newly created frame analyzed with the previous frame.

For example, the difference between frames 1 and 2 can be scored and used by selection logic 106 to determine whether to repeat frame 1, the difference between frames 2 and 3 can be scored and used to determine whether to repeat frame 2, and so on.

Figure 2:
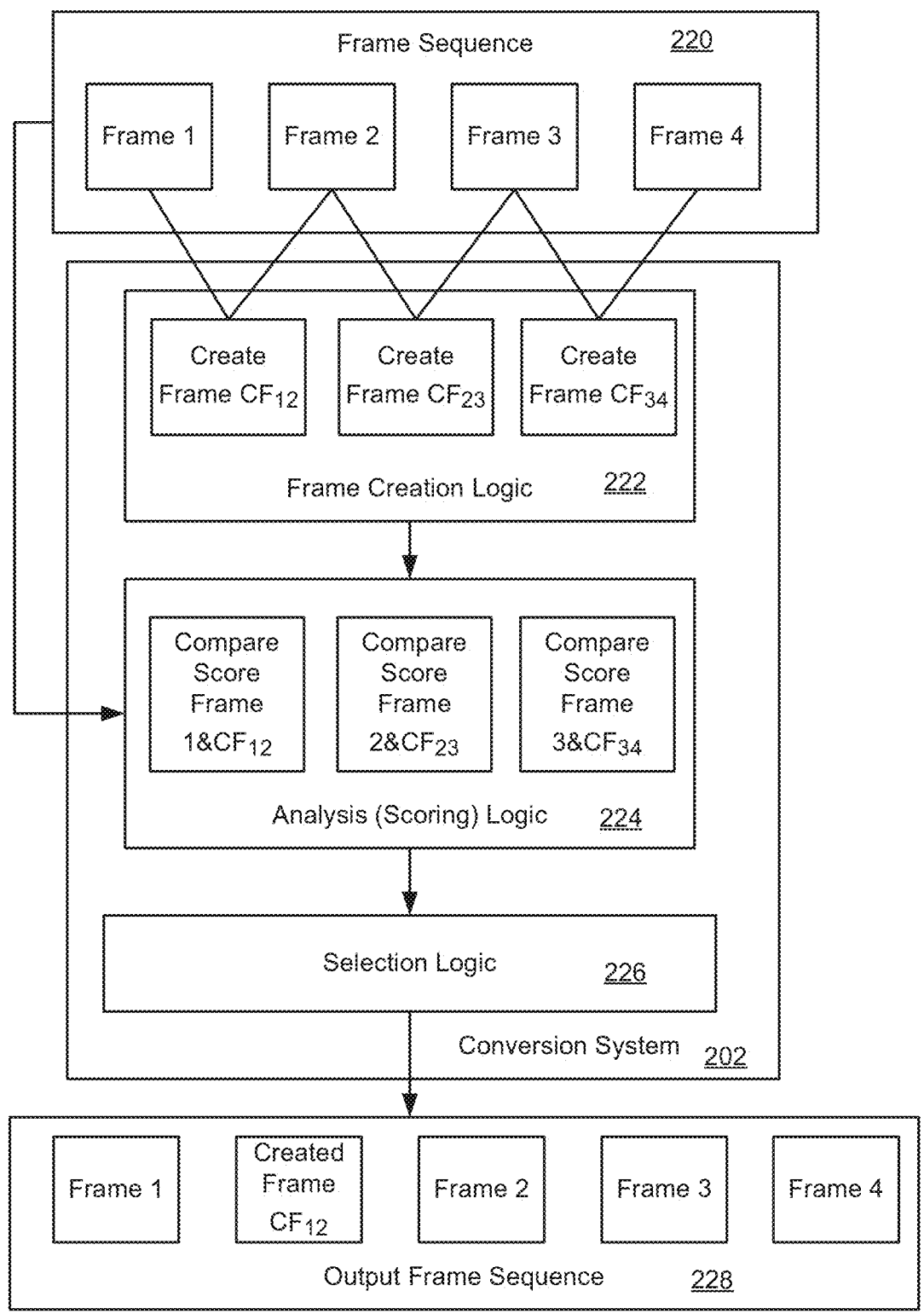
FIG. 2 is a block diagram representation of various example components and data related to analyzing created frames to select a frame for video frame pulldown insertion, in accordance with various aspects and example implementations of the subject disclosure.

Alternatively, as represented in a frame conversion system 202 of FIG. 2, given a frame sequence 220, frames 1 and 2 can be combined by frame creation logic 222 into a created frame $CF_{12}$, with the resulting combined frame scored versus frame 1 by analysis/scoring logic 224 to determine the difference from frame 1. Similarly, frames 2 and 3 can be combined into created frame $CF_{23}$, with that resulting combined frame scored to obtain a difference value relative to frame 2, and so on. In general, the least difference that is found by the selection logic 226 is used to determine the frame to insert into the output frame sequence 228. Thus, instead of (or in addition to) analyzing existing frames for repetition of a frame, the analysis can be performed on created frames, e.g., two frames reconstructed in a suitable way into a new frame.

In one or more implementations, the analysis/scoring of two frames can be accomplished based on the Peak Signal to Noise Ratio (PSNR) of the "Y" (luminance) signal component. This process is relatively efficient when applied to the YUV created during the encoding time, as the "Y" component is available, along with the UV components. If an RGB source is used, the "Y" component can be created. In one or more implementations, the YUV or RGB can be used as the video source, as both have luminance and color information.

In one implementation, the PSNR and Mean Square Error (MSE) are the error metrics used to compare image quality and thereby determine the difference from one frame to another. The PSNR is:

$$PSNR = 10 \cdot \log_{10}\left(\frac{MAX_I^2}{MSE}\right)$$

$$= 20 \cdot \log_{10}\left(\frac{MAX_I}{\sqrt{MSE}}\right)$$

$$= 20 \cdot \log_{10}(MAX_I) - 10 \cdot \log_{10}(MSE)$$

The higher the ratio (PSNR), the better the quality of the compressed or reconstructed image. As part of the process, compare-related operations evaluate how similar one image is to the other image. As can be readily appreciated, motion or scene changes create lower values, whereas a static shot likely has a relatively smaller (or no) difference, giving a higher value. A general goal is to avoid selecting a frame that relates to a scene change, and allow that frame to pass so as to not create a blending of two dissimilar images. Selection of the best available image thus passes over low scored images, e.g., by using the PSNR as the selection criterion.

The generation of the new sequence is based on the analysis. For example, selection logic 106 can be used to select the pair with the least difference, and insert the corresponding frame in the resultant output frame sequence 108. In the example of FIG. 1, frame 3 is selected for repeating based on the analysis. Alternatively, as shown in FIG. 2, the inserted frame may be a created frame, e.g., frames 1 and 2 were combined into a newly created frame $CF_{12}$, and that newly created frame, based on the scoring analysis and the selection versus the scoring for other created frames, can be inserted, following frame 1, into the output frame sequence 226.

Figure 3:
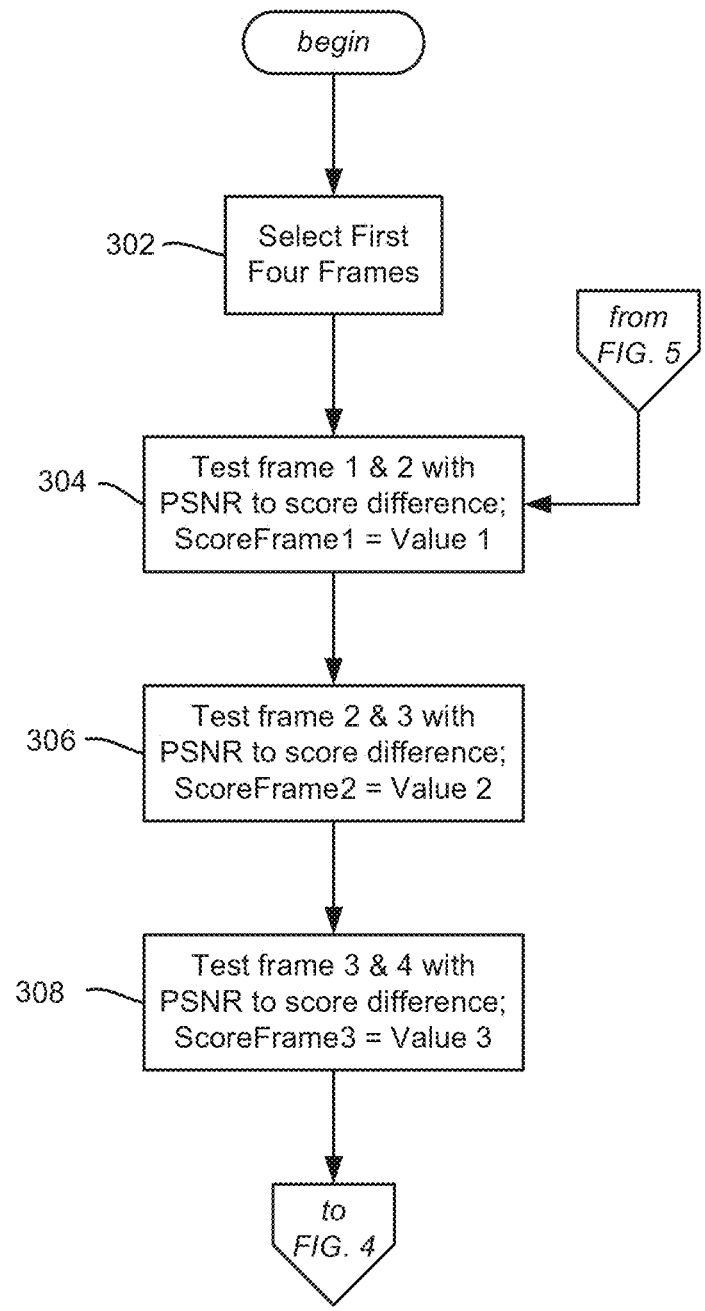
FIGS. 3-5 comprise a flow diagram representing example operations that may be performed with respect to scoring a frame to select a frame for video pulldown insertion, in accordance with various aspects and example implementations of the subject disclosure.
Figure 4:
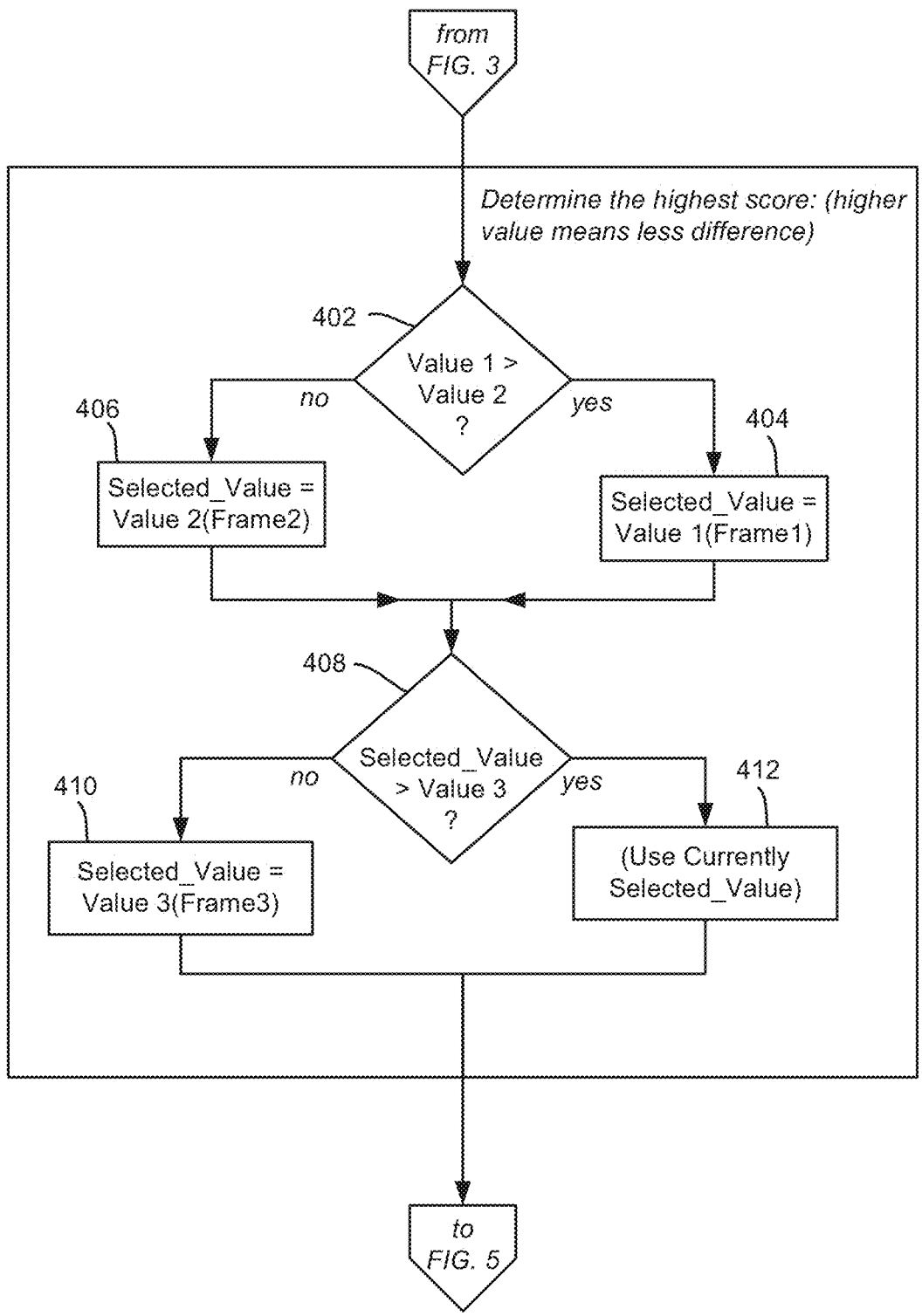
Figure 5:
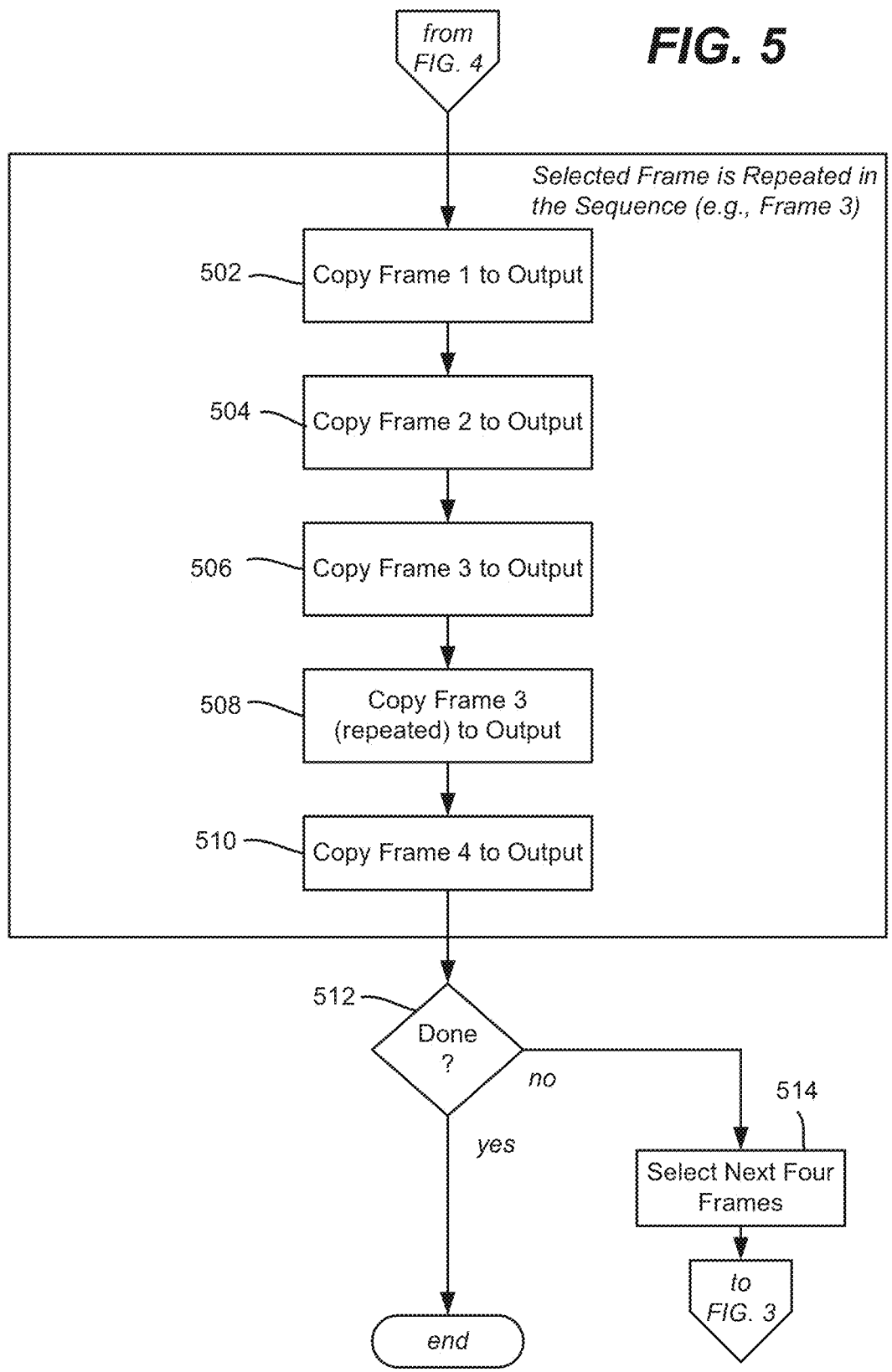

FIGS. 3-5 show example logic for frame analysis and selection, beginning at operation 202 where a (first) group of four frames is selected. Operation 304 tests frame 1 and frame 2 with the PSNR used to score the difference; in this example, ScoreFrame1 is set to the PSNR, represented by Value 1. Operation 306 tests frame 2 and frame 3, with the resulting PSNR used to score this difference; ScoreFrame2 is set to Value 2. Similarly, operation 308 tests frame 3 and frame 4, with the resulting PSNR used to score this last difference; ScoreFrame3 is set to Value 3.

The example operations of FIG. 4 can then be used to select a fame based on the highest score; note that the higher the score, the less the difference. Operations 402, 404 and 406 select the higher of Value1 or Value 2, that is operation 402 evaluates whether Value 1 is greater than Value 2, and if so operation 304 selects Value 1(Frame1) as the Selected_Value; if not, operation 406 selects Value 2(Frame2) as the Selected_Value.

Operations 408, 410 and 412 select the higher of the currently Selected_Value (selected via operation 404 or 406) versus Value3, that is operation 408 evaluates whether the Selected_Value is greater than Value 3, and if not operation 410 selects Value 3(Frame3) as the Selected_Value. Otherwise the selected value remains unchanged, as represented by block 412 (which need not be an actual operation).

With the frame selected, the operations of FIG. 5 repeat the selected frame (or insert a frame if newly created as the selected frame) by placing the selected frame in the sequence. In this example, consider that Frame 3 won the selection process. Thus, at operation 502, Frame 1 is copied to the output, and at operation 504, Frame 2 is copied to the output. Operations 506 and 508 repeat Frame 3, that is, Frame 3 is copied to the output and Frame 3 (repeated), is copied to the output, respectively. Operation 510 copies Frame 4 to the output.

As represented via operations 512 and 514, the above process is repeated for the next four frames from the source, e.g., by returning to operation 304 of FIG. 3, and so on, until the source video is processed into the appropriate number of frames. As can be seen, the selection is such that the repeated (or created) frame is taken based on the least frame-to-frame change.

In one aspect, instead of repeating a frame in a given sequence, a new frame can be created and used in the sequence. Using a new frame in a sequence basically detects a scene change and thereby avoids making a new frame from two dissimilar frames. The same selection process of which frame is being inserted can be used to drive which two frames are used to create the new frame, that is, FIGS. 3-5 can be used with newly created frames rather than repeated frames.

Analyzing and selecting to insert a repeated frame or newly created frame lessens the stutter in this process. In high-dynamic-range (HDR) video, the analysis based selection has a significant impact on the perceived viewing.

Figure 6:
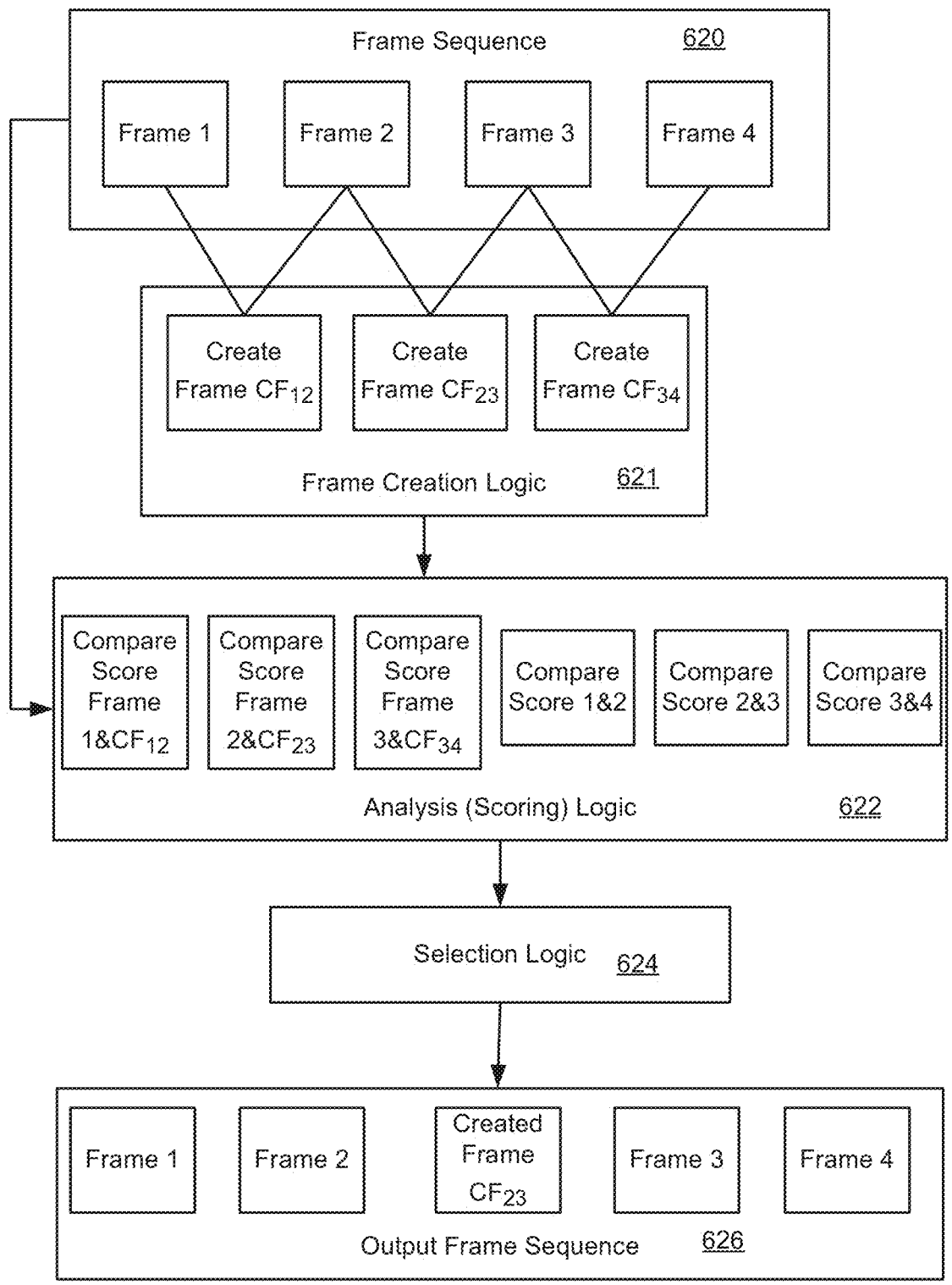
FIG. 6 is a block diagram representation of various example components and data related to analyzing repeated and created frames to select a frame for video frame pulldown insertion, in accordance with various aspects and example implementations of the subject disclosure.

In general, the above process can be used to insert a repeated frame or a newly created frame. For example, FIG. 6 shows a hybrid scoring and selection aspect, comprising frame creation logic 621 and analysis scoring logic 622 that evaluates the scores for frames to possibly repeat as well as scores for created frames. In the example of FIG. 6, the inserted frame is a created frame, e.g., frames 2 and 3 were combined into a newly created frame $CF_{23}$, and that newly created frame, based on the scoring analysis and the selection versus the scoring for other created frames and the frames that are available for repeat, can be inserted, following frame 2, into the output frame sequence 626.

Figure 7:
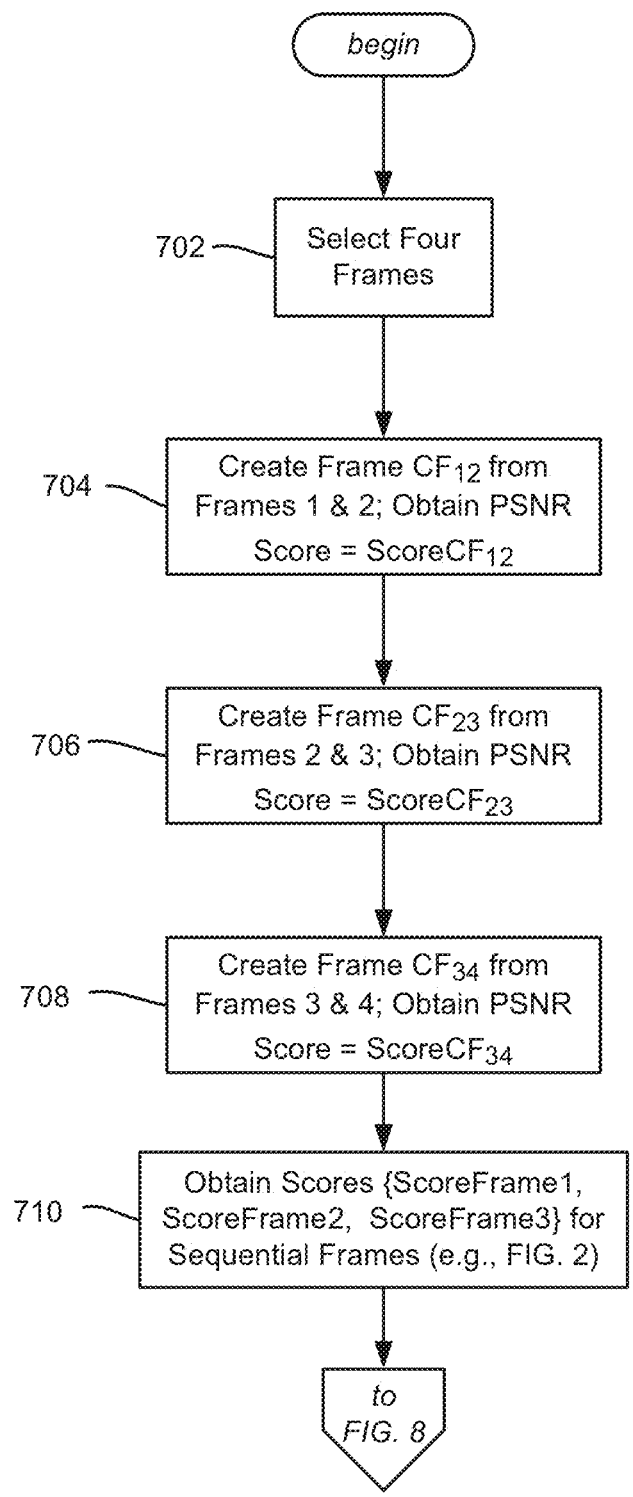
FIGS. 7 and 8 comprise a flow diagram representing example operations that may be performed with respect to scoring repeated frames and created frames to select a frame for video frame pulldown insertion, in accordance with various aspects and example implementations of the subject disclosure
Figure 8:
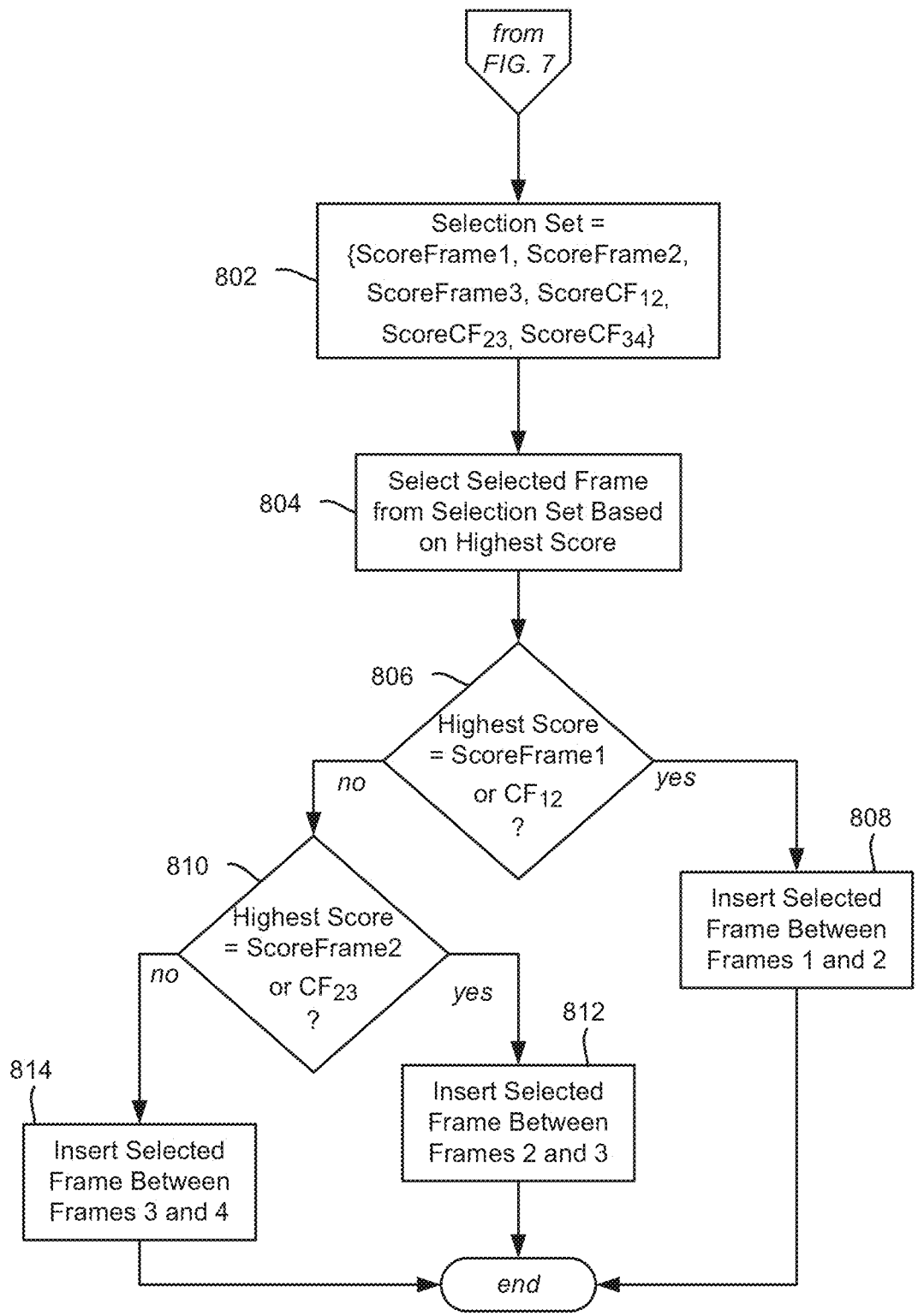

FIGS. 7 and 8 show operations that select the best available frame based on the hybrid model that inserts a repeated or created frame, beginning at operation 702 where four frames are selected for processing into five frames.

Operation 704 creates a frame $CF_{12}$ by combining frames 1 and 2, which is scored based on the difference from frame 1 as $ScoreCF_{12}$. Operation 706 creates a frame $CF_{23}$ by combining frames 2 and 3, which is scored based on the difference from frame 2 as $ScoreCF_{23}$. Operation 708 creates a frame $CF_{34}$ by combining frames 3 and 4, which is scored based on the difference from frame 3 as $ScoreCF_{34}$.

Operation 710 represents obtaining the scoring based on the differences between back-to-back frames, that is, the score of the difference between frames 1 and 2 (ScoreFrame1), the score of the difference between frames 2 and 3 (ScoreFrame2) and the score of the difference between frames 3 and 4 (ScoreFrame3). As is understood, operations 304, 306 and 308 can be used to obtain these scores.

As represented via operation 802, the resultant selection set is six possible selection choices {ScoreFrame1, ScoreFrame2, ScoreFrame3, $ScoreCF_{12}$, $ScoreCF_{23}$, $ScoreCF_{34}$}, that is, the scores for the back-to-back frames (operation 710) and the scores for the created frames (operations 704, 706 and 708). Operation 804 selects the corresponding highest scored frame for insertion.

If, as evaluated by operation 806 the selected frame corresponds to ScoreFrame1 or $CF_{12}$, operation 808 inserts the selected frame (repeated Frame1 or created Frame $CF_{12}$) into the sequence between frames 1 and 2, and the process ends for these four frames. Although not explicitly shown, it is understood that the above operations can be repeated for the next four frames and so on.

Otherwise, operation 810 evaluates whether the selected frame corresponds to ScoreFrame2 or $CF_{23}$. If so, operation 812 inserts the selected frame (repeated Frame2 or created Frame $CF_{23}$) into the sequence. Otherwise operation 814 inserts the selected frame (repeated Frame 3 or created Frame $CF_{23}$) into the sequence. The process is repeated as needed for the video.

The creation of the new frame can be a simple (Y1+Y2)/2 operation, producing an image to which a complex motion analysis can be applied. One alternative is to perform a motion vector review of the images before and after the frame that is created.

Various frame creation procedures can be employed. It is feasible to use different frame creation procedures on the same two frames, with each frame that is created having a resulting score that can be used for selection. Moreover, such frame creation procedures can be adaptive; e.g., fast motion video such as sporting events can use one set of creation and/or selection procedure(s), whereas a movie with relatively little motion can use another. Motion tracking algorithms can adapt dynamically.

One current analysis/test uses RGB (red—green—blue) conversion to HSL (hue—saturation—luminance), with a straightforward lookup for the best match. The eclipse issue, where an item is covered up in a frame and then exposed in the next frame can be considered within motion analysis, as described below.

With respect to metadata, the choice of which frame is created or repeated can be stored and used to create matched metadata (e.g., Dolby Vision® reference processing unit, or RPU). This new data is transformed to match the new image sequence. If Dolby Vision "Profile 5" is to be created (which uses ICtCp color space with metadata such that two different images cannot be blended to create a new image), the process can be moved prior to the YUV (Y represents the luma component and U and V are the chrominance components) that profile uses. In this case the creation of RGB images is likely the fastest solution. The shotlist data can be manipulated to align the XML metadata for the "preproc" processing.

Figure 9:
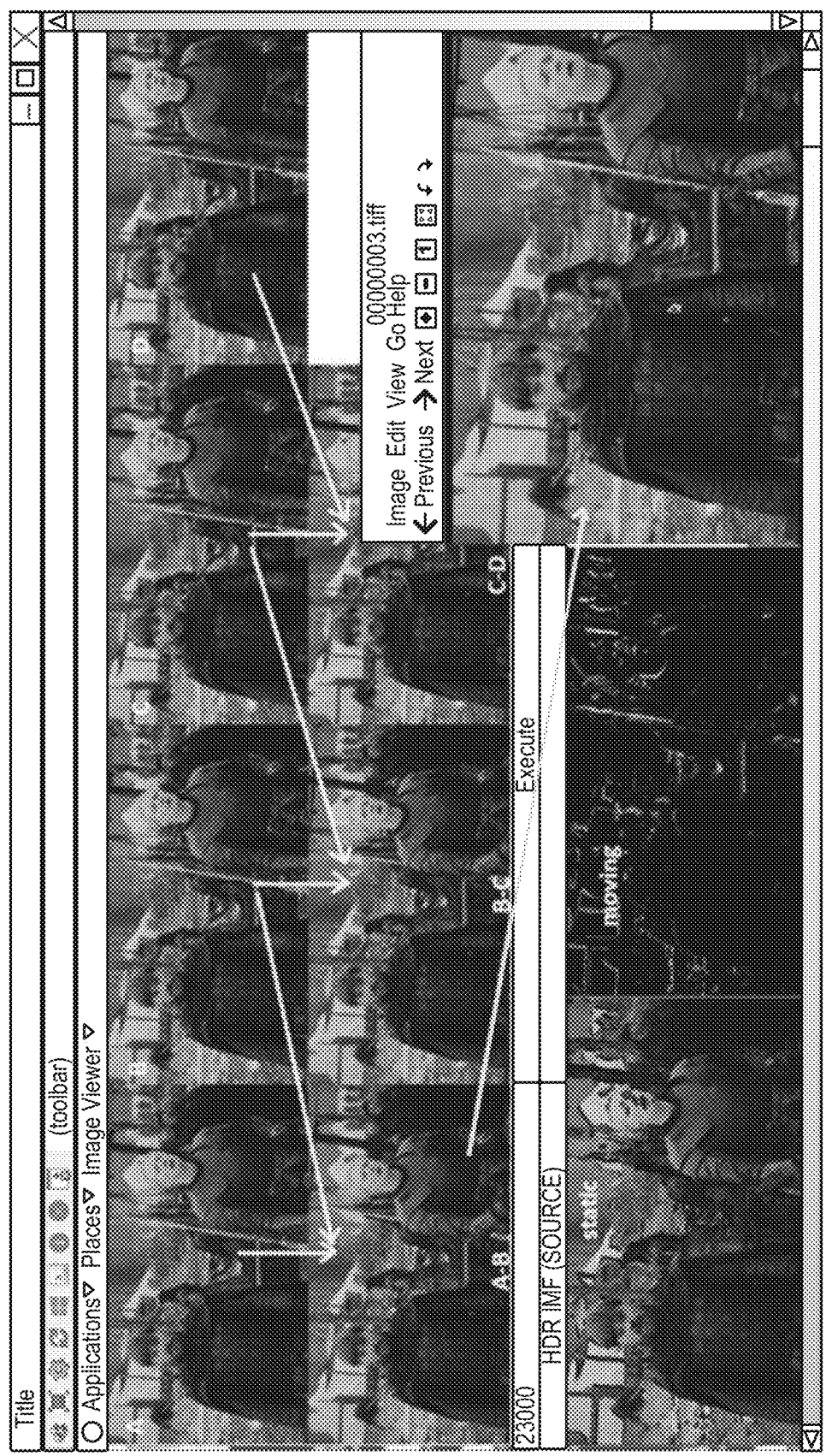
FIG. 9 is an example user interface of a conversion system that can be used to determine a new sequence of frames, in accordance with various aspects and example implementations of the subject disclosure.

In one implementation of a 24 to 30 frame conversion process, FIG. 9 shows an example representation of a user interface to the conversion system. Frame A, B, C and D are the source frames, and A-B, B-C, and C-D are the created frames. The "static" image in FIG. 9 shows the unchanged pixels; the "moving" frame shows pixels determined to be in motion. The bottom right image is a zoomed-in representation of created frame A-B.

In the example of FIG. 9, four frames are extracted from the IMF (MXF) package, where IMF is the Interoperable Master Format and MXF is the Material Exchange Format (SMPTE, Society of Motion Pictures and Television Engineers). For example, the source image can be RGB 12-bit PQ (Perceptual Quantization, the electrical optical transfer function) JPEG2000 (Joint Pictures Expert Group) that is decoded to 12-bit PQ Red, Green and Blue frames.

To obtain motion information, frames A and B are compared, pixel-by-pixel, for their differences. A map of the absolute difference is kept for each color, red, green and blue. As described above, the use of PSNR is applied to obtain a single number that represents the difference between the two frames.

A minimum level of "how different" the images can be set and used to determine whether frames (e.g., frames A to B) comprise a scene change and/or if a given pair of frames is too complex to be used to make a new frame. Scene changes and frames that are deemed too different can be treated the same, e.g., a copy of the second frame is made, for example, A-B then copy B, C-D, copy D.

The difference map that is created is sorted on values for each pixel. Note that not every pixel need be considered to reduce the size of the data; one implementation for example includes only every 32nd pixel in the sort. Such filtering of the data can be adjusted depending on the size of the image.

After completion of the sort, the data is processed for review. In one implementation, the mean value of each color is extracted. A target threshold (for example of 98.0% to 99.505%) is used, which sets the decision level of the difference to mark which pixels are in motion or static. The target threshold improves the operation of the motion analysis by setting the threshold percentage to avoid noise. Adjusting this value will increase or decrease the pixels considered in motion or static.

The frames are then parsed using the value obtained from the sort step. A dataset is created, flagging pixels with a MOVE or STATIC flag set; note that the pixel is RGB, as opposed to prior to the sort where R, G, B was in use). This flag reduces the set of pixels being processed by knowing which pixel to process or not.

A search range in X and Y space is defined. The search can be limited to avoid more processing than is needed. More particularly, a pixel is selected and the pixels around the area defined by the search range are compared for a match. In one implementation, such a match analysis is done by converting the source pixel into two values, Hue and Luminance, where Hue is a representation of the color in a vector format, 0 degrees to 360 degrees, and Luminance ranges from 0 to 1.

Conversion of the Hue vector to a float is performed, 0 to 1; handling of values near 0/360 or 0,1 is used, e.g., 0.00001 and 0.99999 are almost the same for this analysis. Luminance, which represents how bight the pixel is, has no color information. In luminance analysis, the concept of "gravity" is applied. To this end, as the distance from the center of the search is increased, an increasing value is applied to the total score. The total score is thus a combination of Hue, Luminance and gravity. The Hue plus Luminance match with another pixel is a perfect match if zero is obtained. Noise contributes to the equation, whereby gravity wants to pull the answer back to the origin, the target pixel. This is most useful when there is only slight motion. The score and location(x,y) are stored.

Once the search of the pixels in the X,Y region the data is analyzed and the best score is recorded along with the pixel location, X and Y. This is repeated for the pixels in the image that have a flag value of MOVE. Target pixels which are STATIC are not included in the search.

Completion of the search and scoring creates a data set of pixels and locations. To construct a new picture from the data obtained, in one implementation a block of pixel/data is averaged in X and Y. This group of pixels moved in a direction and a distance. To place the block of pixels, the X,Y is divided by two to move one-half the distance. The values stored are the locations of the pixel in A found in B. This distance is the total distance.

However, the process does not operate to reconstruct the B frame, but rather the A-B frame in the middle. The entire moving parts of the frame are assembled using the "block move" step. To finalize the image the data set of pixels that were marked STATIC are overlaid on the frame. This process is repeated for each frame pair when the PSNR analysis meets the required minimum. Because of the cadence of the process, the workload can be distributed over many CPUs in parallel to improve performance.

If image metadata is in play where each frame is paired with image data, the alignment of the data needs to be maintained. The Dolby process creates RPU metadata that is multiplexed with the elemental stream. Using the sequence log of the frame creation, the RPU data is aligned. On the new frame, the data from the first frame of the pair is repeated. This only applies to Profile 8 where PQ EOTF is used.

The conversion from 24 to 30 is for compression delivery. If the source is RGB, the step of creating a Y can be used, with BLOCKs R, G, and B used to create the new image using the Y location data described above.

Figure 10:
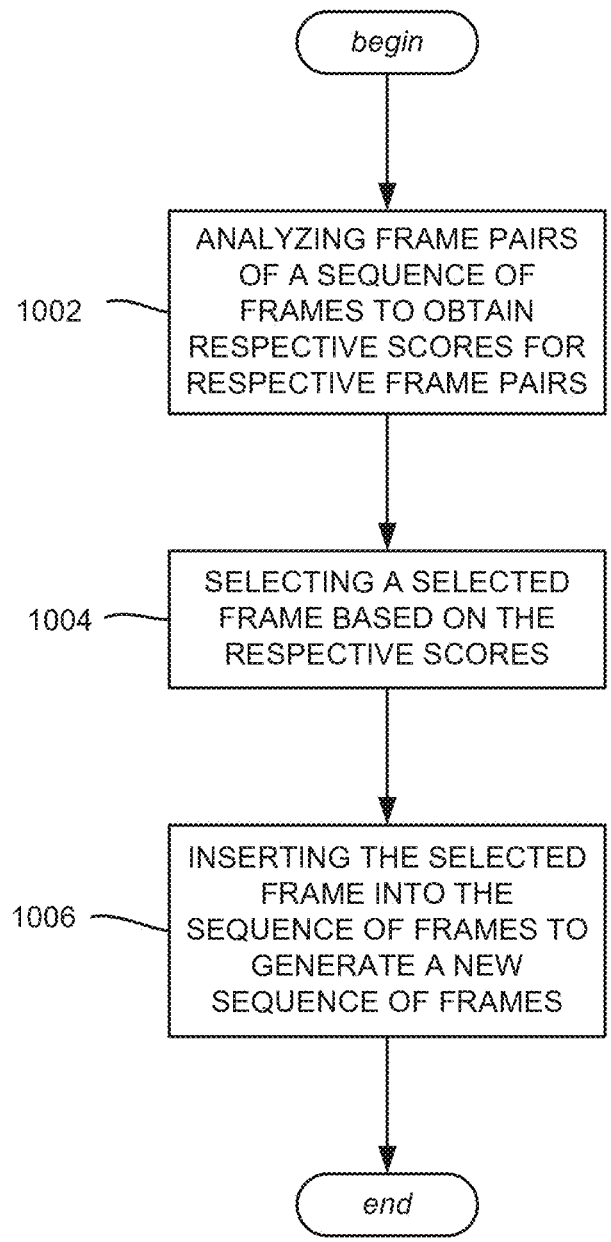
FIG. 10 is a flow diagram representing the generating of a new sequence of frames based on frame analysis of an existing sequence of frames, in accordance with various aspects and example implementations of the subject disclosure.

One or more example aspects, such as corresponding to operations of a method, are represented in FIG. 10. Operation 1002 represents analyzing, by a system comprising a processor, frame pairs of a sequence of frames to obtain respective scores for respective frame pairs; Operation 1004 represents selecting a selected frame based on the respective scores; Operation 1006 represents inserting the selected frame into the sequence of frames to generate a new sequence of frames.

The sequence of frames can be four frames, and inserting the selected frame into the sequence of frames to generate the new sequence of frames can comprise generating the new sequence of frames with five frames.

Selecting the selected frame based on the respective scores can comprise selecting a repeated frame obtained from the sequence of frames.

Aspects can comprise combining two frames of the sequence into a created frame; selecting the selected frame can comprise selecting the created frame. Combining the two frames of the sequence into the created frame can comprise performing motion analysis. Combining the two frames of the sequence into the created frame can comprise determining moving pixels and static pixels, and combining partially moved pixels representing the moving pixels with overlaid static pixels to form the combined frame. Combining the two frames of the sequence into the created frame can comprise generating a missing frame.

Analyzing the frame pairs of the sequence of frames to obtain the respective scores for the respective frame pairs can comprise determining respective peak signal to noise ratios for the respective frame pairs.

Figure 11:
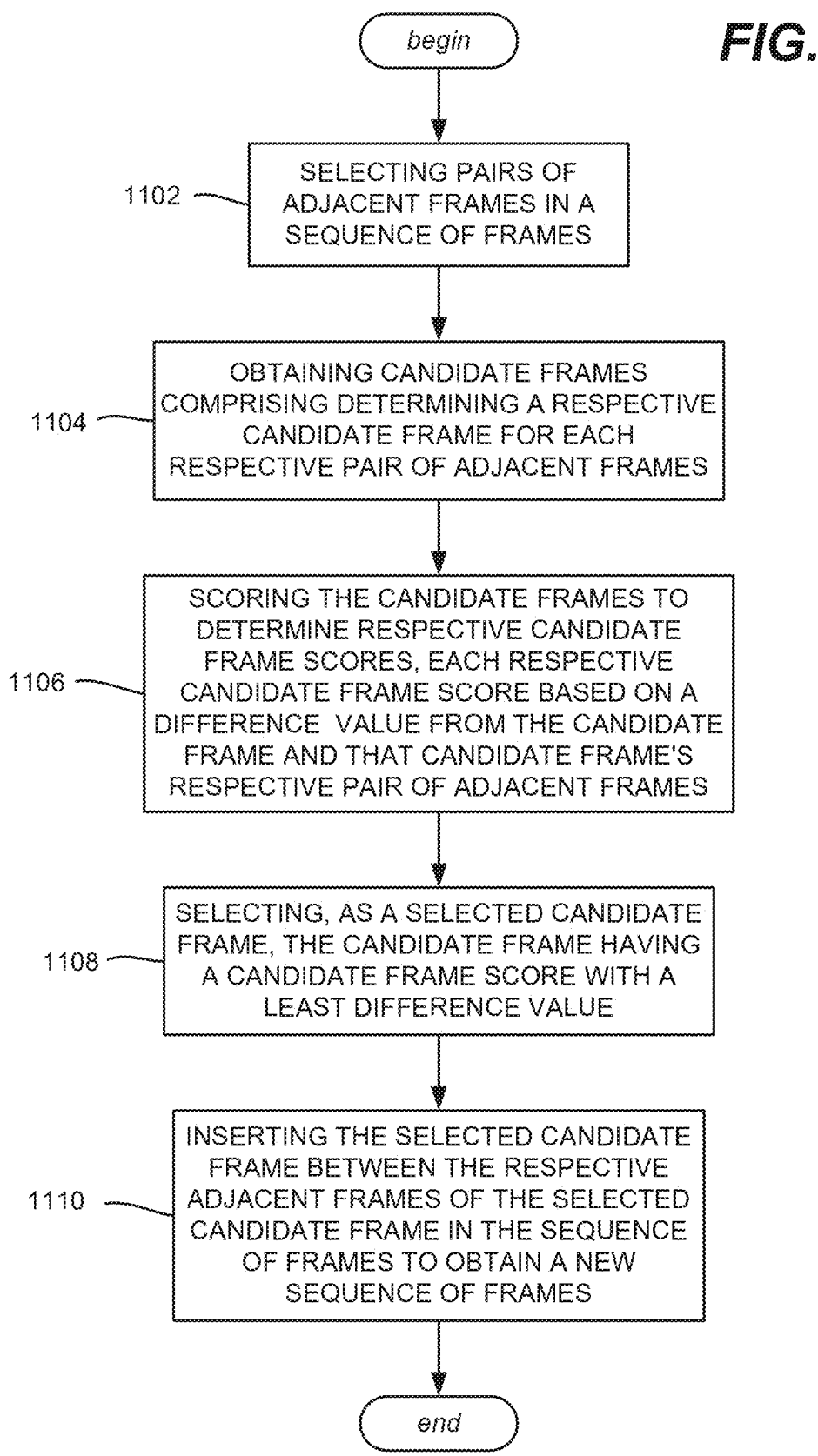
FIG. 11 is a flow diagram representing using pairs of adjacent frames in an existing sequence of frames and scoring candidate frames to obtain a new sequence of frames, in accordance with various aspects and example implementations of the subject disclosure.

One or more aspects can be embodied in a system, such as represented in FIG. 11, and for example can comprise a memory that stores computer executable components and/or operations, and a processor that executes computer executable components and/or operations stored in the memory. Example operations can comprise operation 1102 which represents selecting pairs of adjacent frames in a sequence of frames. Operation 1104 represents obtaining candidate frames comprising determining a respective candidate frame for each respective pair of adjacent frames. Operation 1106 represents scoring the candidate frames to determine respective candidate frame scores, each respective candidate frame score based on a difference value from the candidate frame and that candidate frame's respective pair of adjacent frames. Operation 1108 represents selecting, as a selected candidate frame, the candidate frame having a candidate frame score with a least difference value. Operation 1110 represents inserting the selected candidate frame between the respective adjacent frames of the selected candidate frame in the sequence of frames to obtain a new sequence of frames.

Scoring the candidate frames to determine respective candidate frame scores can comprise determining respective peak signal to noise ratios.

The sequence of frames can have four frames, and the new sequence of frames can have five frames.

The selected frame can be a repeated frame obtained from the sequence of frames.

Obtaining the candidate frames can comprise determining, for each respective pair of adjacent frames, a first respective candidate frame based on a repeated frame, and creating a second respective candidate frame based on combining the respective pair of adjacent frames.

Further operations can comprise, for the respective pairs of adjacent frames, creating respective candidate frames. Creating the respective candidate frames can comprise, for each adjacent frame pair, combining the two adjacent frames into the created frame via motion analysis. Creating the respective candidate frames can comprise, for each adjacent frame pair, combining the two adjacent frames by determining moving pixels and static pixels, and combining partially moved pixels representing the moving pixels with overlaid static pixels to form the combined frame.

Figure 12:
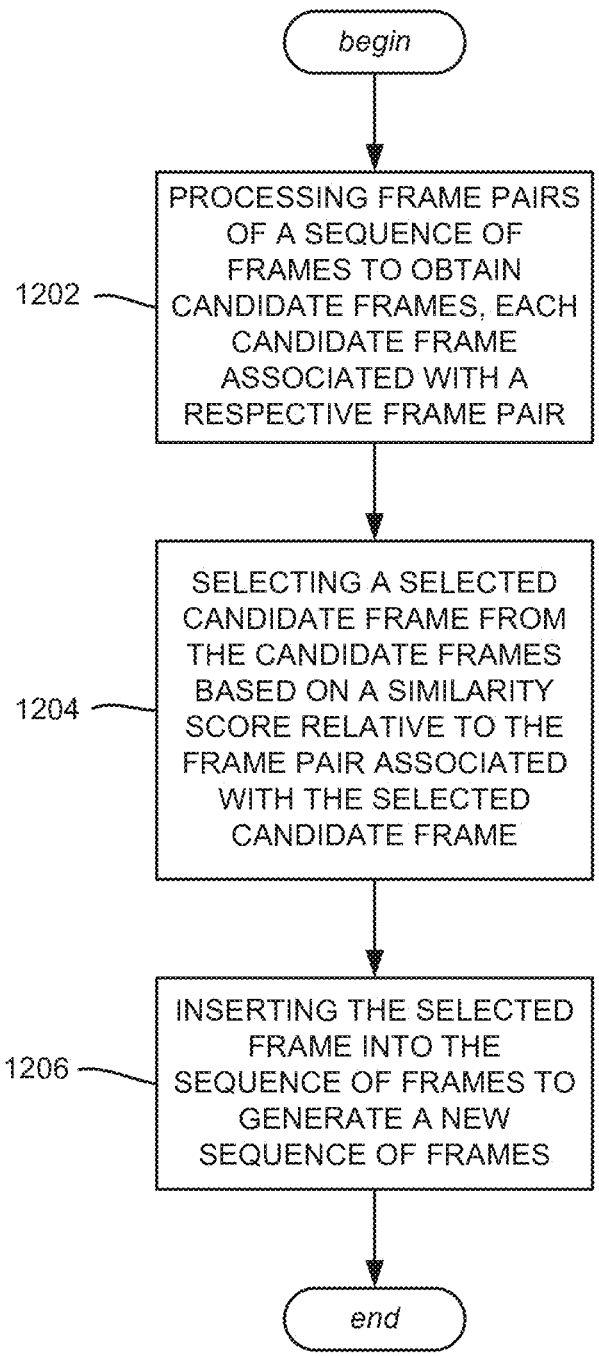
FIG. 12 is a flow diagram representing the generating of a new sequence of frames based on processing an existing sequence of frames, in accordance with various aspects and example implementations of the subject disclosure.

FIG. 12 summarizes various example operations, e.g., corresponding to executable instructions of a machine-readable storage medium, in which the executable instructions, when executed by a processor, facilitate performance of the example operations. Operation 1202 represents processing frame pairs of a sequence of frames to obtain candidate frames, each candidate frame associated with a respective frame pair. Operation 1204 represents selecting a selected candidate frame from the candidate frames based on a similarity score relative to the frame pair associated with the selected candidate frame. Operation 1206 represents inserting the selected frame into the sequence of frames to generate a new sequence of frames.

Processing the frame pairs of the sequence of frames to obtain the candidate frames can comprise repeating a frame of a frame pair to obtain the candidate frame for the associated frame pair.

Processing the frame pairs of the sequence of frames to obtain the candidate frames can comprise creating the candidate frame from the associated frame pair.

Processing the frame pairs of the sequence of frames to obtain the candidate frames can comprise repeating a frame of a frame pair to obtain a first candidate frame for the associated frame pair, and creating a second candidate frame from the associated frame pair.

As can be seen, there is described a technology for video frame pulldown based on frame analysis. The technology can be used to insert a repeated frame and/or a created frame, based on similarity scores evaluated among candidate frames, to generate a new sequence of frames. For example, a sequence of four frames can be converted into a new sequence of five frames.

Figure 13:
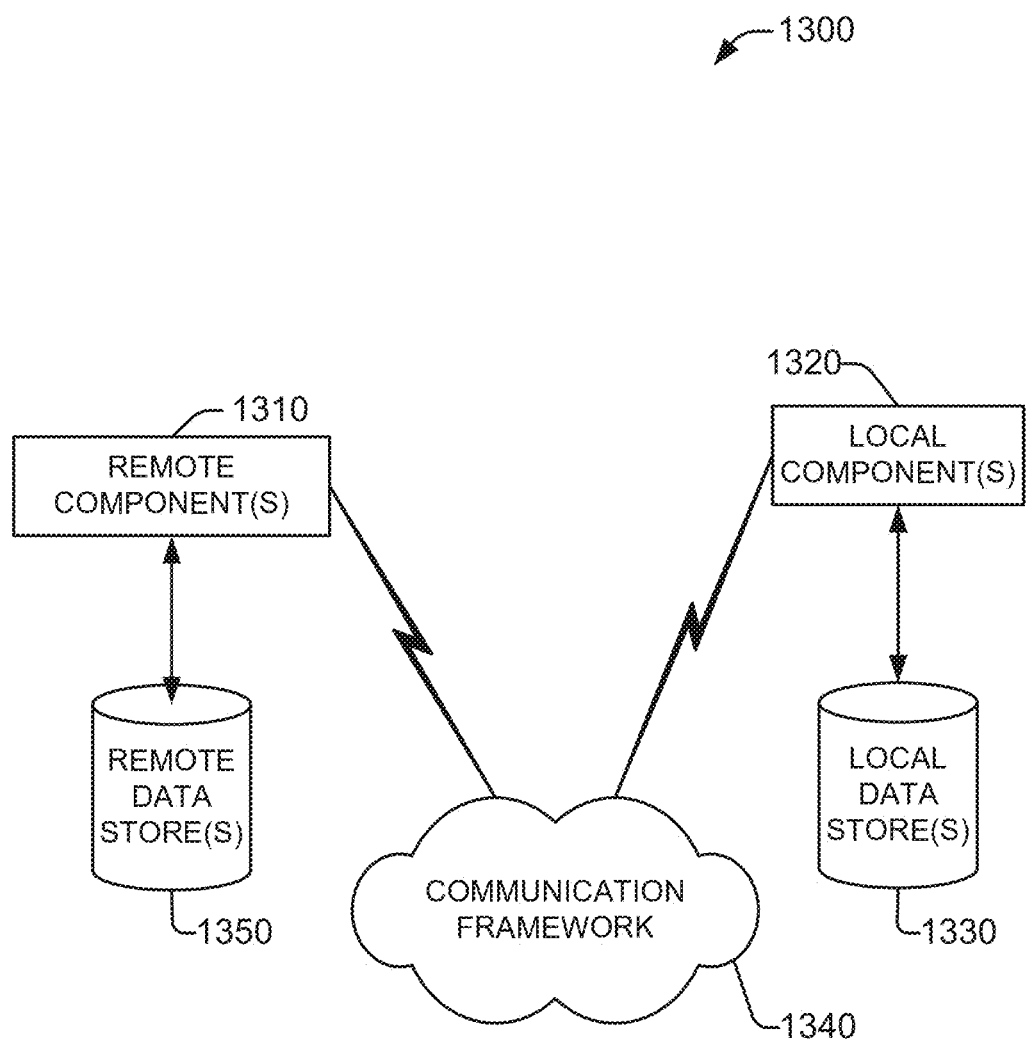
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
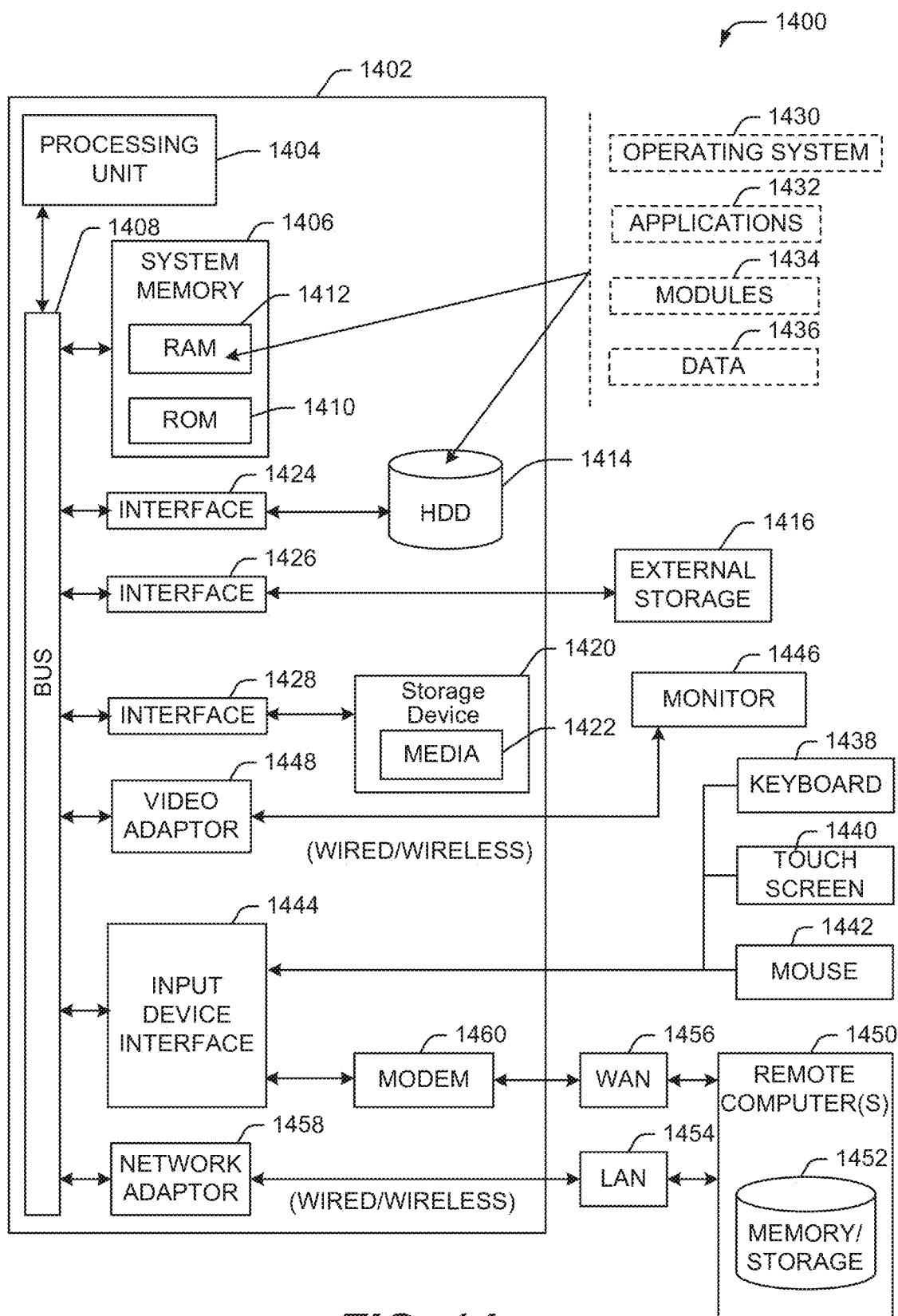
FIG. 14 depicts an example schematic block diagram of a computing environment with which the disclosed subject matter can interact, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A method, comprising:
choosing, by a system comprising a processor, a frame pair of frame pairs in a sequence of frames to insert an additional frame, wherein the sequence of frames comprises at least three frames, each frame pair of the frame pairs comprises adjacent frames in the sequence of frames, and the choosing comprises:
generating multiple candidate frames for each frame pair of the frame pairs using different frame creation procedures for respective candidate frames of the multiple candidate frames,
determining respective scores for the multiple candidate frames;
choosing a candidate frame of the multiple candidate frames based on the respective scores of the candidate frames; and
choosing the frame pair associated with the candidate frame; and
inserting, by the system, the candidate frame as the additional frame between the adjacent frames of the frame pair to generate a new sequence of frames.

2. The method of claim 1, further comprising choosing, by the system, a set of frame creation procedures from sets of frame creation procedures based on a type of media content of a media object containing the sequence of frames, and wherein the set of frame creation procedures comprises the different frame creation procedures.

3. The method of claim 1, further comprising choosing, by the system, a set of frame creation procedures from sets of frame creation procedures based on a type of motion in a video object containing the sequence of frames, and wherein the set of frame creation procedures comprises the different frame creation procedures.

4. The method of claim 1, wherein a score of the respective scores is indicative of a similarity of an associated candidate frame to a frame of an associated frame pair.

5. The method of claim 4, wherein the choosing the candidate frame comprises selecting the candidate frame with the score indicative of a greatest similarity to the frame of the associated frame pair.

6. The method of claim 4, wherein the choosing the candidate frame comprises selecting the candidate frame with the score indicative of a least similarity to the frame of the associated frame pair.

7. The method of claim 1, wherein the respective scores are based on peak signal to noise ratio data.

8. A system, comprising:
a processor, and
a memory that stores executable instructions that, when executed by the processor, facilitate performance of operations, the operations comprising:
generating a new sequence of frames from a sequence of frames, wherein the generating comprises:
determining a frame pair of frame pairs in the sequence of frames to insert an additional frame, wherein the sequence of frames comprises at least three frames, each frame pair of the frame pairs comprises adjacent frames in the sequence of frames, and the choosing comprises:
generating multiple candidate frames for each frame pair of the frame pairs using different frame creation procedures for respective candidate frames of the multiple candidate frames,
determining respective scores for the multiple candidate frames;
determining a candidate frame of the multiple candidate frames based on the respective scores of the candidate frames; and
determining the frame pair associated with the candidate frame; and
inserting the candidate frame as the additional frame between the adjacent frames of the frame pair to generate the new sequence of frames.

9. The system of claim 8, wherein the operations further comprise determining a set of frame creation procedures from sets of frame creation procedures based on a type of media content of a media object containing the sequence of frames, and wherein the set of frame creation procedures comprises the different frame creation procedures.

10. The system of claim 8, wherein the operations further comprise determining a set of frame creation procedures from sets of frame creation procedures based on a type of motion in a video object containing the sequence of frames, and wherein the set of frame creation procedures comprises the different frame creation procedures.

11. The system of claim 8, wherein a score of the respective scores is indicative of a similarity of an associated candidate frame to a frame of an associated frame pair.

12. The system of claim 11, wherein the determining the candidate frame comprises determining the candidate frame with the score indicative of a greatest similarity to the frame of the associated frame pair.

13. The system of claim 11, wherein the determining the candidate frame comprises determining the candidate frame with the score indicative of a least similarity to the frame of the associated frame pair.

14. The system of claim 8, wherein the respective scores are based on peak signal to noise ratio determinations.

15. A non-transitory machine-readable storage medium, comprising executable instructions that, when executed by a processor, facilitate performance of operations, the operations comprising:
- performing frame pulldown on a sequence of frames, comprising:
  - selecting a frame pair of frame pairs in the sequence of frames to insert an additional frame, wherein the sequence of frames comprises at least three frames, each frame pair of the frame pairs comprises adjacent frames in the sequence of frames, and the selecting comprises:
    - generating multiple candidate frames for each frame pair of the frame pairs using different frame creation procedures for respective candidate frames of the multiple candidate frames,
    - determining respective scores for the multiple candidate frames;
    - selecting a candidate frame of the multiple candidate frames based on the respective scores of the candidate frames; and
    - selecting the frame pair associated with the candidate frame; and
  - inserting the candidate frame as the additional frame between the adjacent frames of the frame pair to generate a new sequence of frames.

16. The non-transitory machine-readable storage medium of claim 15, wherein the operations further comprise selecting a set of frame creation procedures from sets of frame creation procedures based on a type of media content of a media object containing the sequence of frames, and wherein the set of frame creation procedures comprises the different frame creation procedures.

17. The non-transitory machine-readable storage medium of claim 15, wherein the operations further comprise selecting a set of frame creation procedures from sets of frame creation procedures based on a type of motion in a video object containing the sequence of frames, and wherein the set of frame creation procedures comprises the different frame creation procedures.

18. The non-transitory machine-readable storage medium of claim 15, wherein a score of the respective scores is indicative of a similarity of an associated candidate frame to a frame of an associated frame pair.

19. The non-transitory machine-readable storage medium of claim 18, wherein the selecting the candidate frame comprises selecting the candidate frame with the score indicative of a greatest similarity to the frame of the associated frame pair.

20. The non-transitory machine-readable storage medium of claim 19, wherein the selecting the candidate frame comprises selecting the candidate frame with the score indicative of a least similarity to the frame of the associated frame pair.

* * * * *